United States Patent
Baradel et al.

(10) Patent No.: US 12,552,941 B2
(45) Date of Patent: Feb. 17, 2026

(54) CALCIUM CARBONATE TREATED WITH FUNCTIONALIZED POLY- AND/OR PERFLUORINATED COMPOUNDS

(71) Applicant: OMYA INTERNATIONAL AG, Oftringen (CH)

(72) Inventors: Franck Baradel, Zofingen (CH); Matthias Welker, Hesingue (FR)

(73) Assignee: OMYA INTERNATIONAL AG, Oftringen (CH)

( * ) Notice: Subject to any disclaimer, the term of this patent is extended or adjusted under 35 U.S.C. 154(b) by 659 days.

(21) Appl. No.: 17/634,983

(22) PCT Filed: Sep. 3, 2020

(86) PCT No.: PCT/EP2020/074662
§ 371 (c)(1),
(2) Date: Feb. 13, 2022

(87) PCT Pub. No.: WO2021/043935
PCT Pub. Date: Mar. 11, 2021

(65) Prior Publication Data
US 2022/0298356 A1   Sep. 22, 2022

(30) Foreign Application Priority Data
Sep. 4, 2019   (EP) .................................... 19195455

(51) Int. Cl.
| C09C 1/02 | (2006.01) |
| C08K 3/26 | (2006.01) |
| C08K 9/04 | (2006.01) |
| C09C 3/08 | (2006.01) |
| C09C 3/10 | (2006.01) |
| C09D 7/40 | (2018.01) |
| C09D 7/62 | (2018.01) |

(52) U.S. Cl.
CPC ............... *C09C 1/021* (2013.01); *C08K 3/26* (2013.01); *C08K 9/04* (2013.01); *C09C 3/08* (2013.01); *C09C 3/10* (2013.01); *C09D 7/62* (2018.01); *C09D 7/68* (2018.01); *C09D 7/69* (2018.01); *C01P 2004/61* (2013.01); *C01P 2004/62* (2013.01); *C01P 2006/12* (2013.01); *C08K 2003/265* (2013.01); *C08K 2201/005* (2013.01); *C08K 2201/006* (2013.01)

(58) Field of Classification Search
CPC ...... C08K 9/04; C08K 3/26; C08K 2003/265; C09C 3/08; C09C 3/10; C09C 1/021
See application file for complete search history.

(56) References Cited

U.S. PATENT DOCUMENTS

| 4,430,468 A * | 2/1984 | Schumacher | ........ D06N 7/0076 |
| | | | 524/427 |
| 4,661,537 A * | 4/1987 | Ancker | ............... C08K 13/02 |
| | | | 524/145 |
| 2015/0000564 A1 * | 1/2015 | Blanchard | .............. D21H 21/52 |
| | | | 423/430 |
| 2015/0218381 A1 * | 8/2015 | O'Halloran | ............. C09C 1/021 |
| | | | 556/466 |
| 2017/0174895 A1 * | 6/2017 | Fornera | .................. C01F 11/185 |

FOREIGN PATENT DOCUMENTS

| EP | 1712523 A1 | 10/2006 | |
| EP | 1712597 A1 | 10/2006 | |
| EP | 2371766 A1 | 10/2011 | |
| EP | 2447213 A1 | 5/2012 | |
| EP | 2524898 A1 | 11/2012 | |
| EP | 3312242 A1 | 4/2018 | |
| JP | 2000264813 A * | 9/2000 | |
| JP | 2004035661 A * | 2/2004 | |
| WO | WO-9818892 A2 * | 5/1998 | ........... C11D 3/3765 |
| WO | 2010/030579 A1 | 3/2010 | |
| WO | 2013/142473 A1 | 9/2013 | |

OTHER PUBLICATIONS

Partial machine translation of JP-2000264813-A (Year: 2000).*
Partial machine translation of JP-2004035661-A (Year: 2004).*
International Search Report from PCT/EP2020/074662, mailed Sep. 25, 2020, 4 pages.
Written Opinion from PCT/EP2020/074662, mailed Sep. 25, 2020, 7 pages.
Kim et al. (2018) "Surface modification of calcium carbonate nanoparticles by fluorosurfactant" Colloids and Surfaces A, vol. 536, pp. 213-223.
Morel et al. (2012) "Surface modification of calcium carbonate nanofillers by fluoro- and alkyl-alkoxysilane: Consequences on the morphology, thermal stability and gas barrier properties of polyvinylidene fluoride nanocomposites" European Polymer Journal, vol. 48, pp. 919-929.
Sawada et al. (2007) "Preparation and applications of novel fluoroalkyl end-capped oligomers/calcium carbonate nanocomposites" Colloid Polym Sci, vol. 285, pp. 499-506.

* cited by examiner

*Primary Examiner* — Kregg T Brooks
(74) *Attorney, Agent, or Firm* — ALGM LLP; Harry J. Guttman

(57) ABSTRACT

The present invention relates to a functionalized poly- and/or perfluorinated compound treated calcium carbonate, wherein the calcium carbonate is surface treated with at least one functionalized poly- and/or perfluorinated compound, a process for preparing the poly- and/or perfluorinated compound treated calcium carbonate, the use of the poly- and/or perfluorinated compound treated calcium carbonate as a filler and/or a surface coating agent, fillers and surface coating agents comprising the poly- and/or perfluorinated compound treated calcium carbonate, and polymers comprising the poly- and/or perfluorinated compound treated calcium carbonate.

21 Claims, No Drawings

CALCIUM CARBONATE TREATED WITH FUNCTIONALIZED POLY- AND/OR PERFLUORINATED COMPOUNDS

The present invention relates to a poly- and/or perfluorinated compound treated calcium carbonate, a process for preparing the poly- and/or perfluorinated compound treated calcium carbonate, the use of the poly- and/or perfluorinated compound treated calcium carbonate as a filler and/or a surface coating agent, fillers and surface coating agents comprising the poly- and/or perfluorinated compound treated calcium carbonate, and polymers comprising the poly- and/or perfluorinated compound treated calcium carbonate.

For many decades, plastics belong to the most important materials allowing to adapt its properties in a wide range as desired, and being applied in nearly every field. Accordingly, from the technical point of view, plastics are one of the most promising and forward-looking materials, especially in view of the scarcity of comparable materials of natural origin.

Thus, so called engineering plastics have been developed, that have better mechanical and/or thermal properties than the more widely used commodity plastics. Examples of engineering plastics inter alia include polycarbonates, polyamides (nylons), and acrylonitrile butadiene styrene (ABS).

Engineering plastics have gradually replaced traditional engineering materials such as wood or metal in many applications. Besides equaling or surpassing them in weight/strength and other properties, engineering plastics are much easier to manufacture, especially in complicated shapes.

Each engineering plastic usually has a unique combination of properties that may make it the material of choice for some application. For example, polycarbonates are highly resistant to impact, while polyamides are highly resistant to abrasion. Other properties exhibited by various grades of engineering plastics include heat resistance, mechanical strength, rigidity, chemical stability, self-lubrication (specially used in manufacturing of gears & skids) and fire safety.

For achieving these properties, very often additives are added during the compounding process, such as perfluorinated compounds or metals.

Some of these additives, however, are believed to have severe drawbacks from an ecological and health point of view, and are also not very easily to handle.

Therefore, it is one of the big challenges to further develop plastic materials, as well as the additives used therein, e.g. in terms of ecological or health impact by reducing or replacing hazardous components in plastics.

Looking at perfluorinated compounds, one of the most widely used one is polytetrafluoroethylene (PTFE), which, for a very long time, has been considered as one of the most important modern material. PTFE is a fluorocarbon solid, which is strongly hydrophobic due to the high electronegativity of fluorine. PTFE has one of the lowest coefficients of friction of any solid, has distinctive non-stickiness properties, making it an excellent lubricant, and is highly wear resistant. It is nonreactive, and thus inert in contact with reactive and corrosive chemicals.

However, processing PTFE can be difficult and expensive, especially when used as an additive in plastic materials. Thus, it is not compatible with a number of polymers, it tends to migrate to the surface of the polymers when used as a filler, and degrades at high temperatures. Furthermore it has been critically discussed as regards its ecotoxicity in the last years.

There are also other per- and polyfluorinated compounds, such as e.g. perfluoropolyethers (PFPE), which are usually liquid or pasty at room temperature, and are used as lubricants.

Commercially available PFPEs are e.g. those being marketed under the tradenames Krytox™ or Fluoroguard™ by Chemours (formerly DuPont) or under the tradenames Fomblin® and Galden® by Solvay.

Krytox™ and Fluoroguard™ refers to a group of colourless synthetic lubricants (oils and greases) with a variety of applications, inter alia in polymers.

The use of PFPEs, especially liquid PFPEs in polymers however may be difficult, as, due to their oily consistence, these compounds often are not easily compounded with the polymer pellets, and tend to migrate to the surface of the polymer.

Accordingly, there is still a need for compounds, on the one hand having or improving the advantageous properties of poly- and/or perfluorinated compounds known in the art, and, on the other hand avoiding or reducing critical side effects thereof, and improving their processability and handling.

Accordingly, it is an object of the present invention to provide compounds having comparable or better properties than compounds like PTFE or PFPE, e.g. when used as additives in polymers, especially improved engineered polymer applications, e.g. as regards stiffness, surface properties, such as haptic, tribology, and/or self-lubrication, low surface energy, soil/dirt resistance, chemical, heat and moisture resistance, oil and grease resistance, abrasion resistance, vapour permeability, UV resistance, non-stickiness, electrical insulation and dielectric properties, low refractive index, optical properties such as yellowing, gloss, etc., and at the same time avoiding or reducing the drawbacks of conventionally used poly- and/or perfluorinated compounds, and being more easily processible and less ecotoxic.

Very surprisingly, it has now been found that, when combining a certain type of compounds, namely functionalized poly- and/or perfluorinated compounds, with calcium carbonate, comparable properties can be achieved as when using e.g. PTFE of PFPE, and even better results.

By the use of the functionalized poly- and/or perfluorinated compound treated calcium carbonate, high end polymers may be provided having improved weatherability, improved wettability, improved corrosion resistance, improved stain resistance, which is easy to clean, has enhanced stability in extreme environments, improved flow, adhesion, gloss, clarity, smoother finishes, enhanced demoulding properties, enhanced anti-static properties, and anti-drip properties in flame retardants, etc.

Furthermore high contact angles with polar and nonpolar liquids may be observed providing both hydrophobicity and lipophobicity to the polymer, which may be especially useful e.g. in applications such as in filtration systems, The synergy between the calcium carbonate and the functionalized poly- and/or perfluorinated compound leads to a multifunctional filler, offering specific surface and tribology properties.

The excellent anti-wear, anti-drip, and water repellency properties of the inventive compounds even allow for the substitution of glass fibres in high-end compounds, and the substitution of metal additives in polymers, inter alia leading to a weight reduction.

For example, a better tribology and anti-wear functionality of the functionalized poly- and/or perfluorinated compound treated calcium carbonate allows for a better melt rheology and flow of the engineered polymer compound filled therewith, leading, e.g. to a reduced pressure during compounding for highly filled polymers.

It has also been found that, by the combination of calcium carbonate containing mineral filler with functionalized poly- and/or perfluorinated compound, an improved compound rheology can be achieved allowing for a higher filler load, and thus a reduction of the overall costs of the polymer.

Furthermore, the poly- and/or perfluorinated compound treated calcium carbonate containing mineral may be compounded much more easily with the polymer, is not or less subjected to migration to the surface of the polymer, and the amount of poly- and/or perfluorinated compound can be reduced.

Thus, the calcium carbonate also allows the introduction of a functionalized fluoropolymer oil, which is difficult to handle and use in compounding process, in high end compounds.

Accordingly, the poly- and/or perfluorinated compound treated calcium carbonates may be advantageously used as additives in polymers, especially as fillers, and/or surface coating agents.

By the use of the functionalized poly- and/or perfluorinated compound treated calcium carbonate, high end polymers may be provided having improved weatherability, improved wettability, improved corrosion resistance, improved stain resistance, which is easy to clean, has enhanced stability in extreme environments, improved flow, adhesion, gloss, clarity, smoother finishes, enhanced demoulding properties, enhanced anti-static properties, and anti-drip properties in flame retardants, etc.

Thus, the foregoing and other objects are solved by the subject-matter as defined in the independent claims. Advantageous embodiments of the present invention are defined in the corresponding subclaims.

It should be understood that for the purpose of the present invention, the following terms have the following meaning:

Where an indefinite or definite article is used when referring to a singular noun, e.g., "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

Whenever the terms "including" or "having" are used, these terms are meant to be equivalent to "comprising" as defined hereinabove.

Accordingly, in a first aspect, the present invention relates to a fluorinated compound treated calcium carbonate, wherein the calcium carbonate is surface treated with at least one functionalized poly- and/or perfluorinated compound.

In the meaning of the present invention "fluorinated compound treated calcium carbonate" or "functionalized poly- and/or perfluorinated compound treated calcium carbonate" or "poly- and/or perfluorinated compound treated calcium carbonate" refers to a calcium carbonate being surface treated with at least one functionalized poly- and/or perfluorinated compound according to the invention.

In the meaning of the present invention, the terms "carboxylic acid group" and "carboxyl group" are used interchangeably and refer to the functional group —C(=O)OH.

In the meaning of the present invention, calcium carbonate means a calcium carbonate-comprising material referring to a material which is a source of calcium carbonate.

In a preferred embodiment, the calcium carbonate is selected from the group comprising natural ground calcium carbonate (GCC) and precipitated calcium carbonate (PCC), as well as mixed calcium carbonate containing minerals such as dolomite, and mixtures thereof.

"Natural ground calcium carbonate" (GCC) in the meaning of the present invention is a calcium carbonate obtained from natural sources, such as limestone, marble, or chalk, and processed through a wet and/or dry treatment such as grinding, screening and/or fractionating, for example, by a cyclone or classifier.

"Natural ground calcium carbonate" (GCC) preferably is selected from calcium carbonate containing minerals selected from the group comprising marble, chalk, limestone and mixtures thereof.

Natural calcium carbonate may comprise further naturally occurring components such as magnesium carbonate, alumino silicate etc.

In general, the grinding of natural ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate containing mineral material comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

"Precipitated calcium carbonate" (PCC) in the meaning of the present invention is a synthesized material, generally obtained by precipitation following reaction of carbon dioxide and calcium hydroxide in an aqueous, semi-dry or humid environment or by precipitation of calcium and carbonate ion source, for example $CaCl_2$ and $Na_2CO_3$, out of solution in water. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment of the present invention, the precipitated calcium carbonate is precipitated calcium carbonate, preferably comprising aragonitic, vateritic or calcitic mineralogical crystal forms or mixtures thereof. PCCs are described, for example, in EP2447213 A1, EP2524898 A1, EP2371766 A1, EP1712597 A1, EP1712523 A1, or WO2013142473 A1.

In a special embodiment, the calcium carbonate may also be pretreated before being combined with the poly- and/or perfluorinated compound. Thus, calcium carbonate may e.g. be pretreated with conventional treatment agents in this technical field, such as mono-substituted alkenyl succinic anhydride (2,5-furandione, dihydro-, mono-$C_{15-20}$-alkenyl derivatives, CAS No. 68784-12-3), which is a blend of mainly branched octadecenyl succinic anhydrides (CAS #28777-98-2) and mainly branched hexadecenyl succinic anhydrides (CAS #32072-96-1), or with fatty acids, such as stearic acid and palmitic acid. Such surface treatment is known to the skilled person, e.g. from WO 2010/030579 referring to stearic acid treated calcium carbonate having low or no detectable free stearic acid.

It is especially preferred that the calcium carbonate has a weight median particle size $d_{50}$ in the range of from 0.1 µm to 20 µm, preferably from 0.2 µm to 10 µm, more preferably from 0.7 µm to 5 µm and most preferably from 1.8 µm to 3.4 µm.

In a further preferred embodiment, the calcium carbonate has a top cut particle size ($d_{98}$) of not more than 100 µm, preferably not more than 40 µm, even more preferably not more than 25 µm, most preferably not more than 15 µm, and especially is from 2.9 to 13.8 µm, e.g. from 5.8 to 7.4 µm.

The "particle size" of particulate materials herein is described by its weight-based distribution of particle sizes $d_x$. Therein, the value $d_x$ represents the diameter relative to which x % by weight of the particles have diameters less than $d_x$. This means that, for example, the $d_{20}$ value is the particle size at which 20 wt.-% of all particles are smaller than that particle size. The $d_{50}$ value is thus the weight median particle size, i.e. 50 wt.-% of all particles are smaller than this particle size. For the purpose of the present invention, the particle size is specified as weight median particle size $d_{50}$(wt) unless indicated otherwise.

Furthermore, the calcium carbonate may have a specific surface area (BET) of from 0.5 to 150 m$^2$/g, preferably from 1 to 50 m$^2$/g, more preferably from 1.5 to 40 m$^2$/g, even more preferably from 2 to 25 m$^2$/g, especially from 2.6 to 4.1 m$^2$/g and most preferably from 2.9 to 7.9 m$^2$/g as measured by the BET nitrogen method.

The more preferred calcium carbonates according to the present invention are selected from the group comprising dry ground calcium carbonate having a weight median particle diameter $d_{50}$ of 1.5 to 2.0 µm, a $d_{98}$ of 6.0 to 8.0 µm, and a BET specific surface area of 3.3 to 4.8 m$^2$/g and a wet ground and spray dried calcium carbonate having a weight median particle diameter $d_{50}$ of 0.5 to 0.9 µm, a $d_{98}$ of 2.4 to 3.5 µm, and a BET specific surface area of 7.0 to 9.0 m$^2$/g.

Especially preferred calcium carbonates according to the present invention are selected from the group comprising dry ground calcium carbonate having a weight median particle diameter $d_{50}$ of 1.8 µm, a $d_{98}$ of 7.4 µm, and a BET specific surface area of 4.1 m$^2$/g, and a wet ground and spray dried calcium carbonate having a weight median particle diameter $d_{50}$ of 0.7 µm, a $d_{98}$ of 2.9 µm, and a BET specific surface area of 7.9 m$^2$/g.

According to the present invention, the calcium carbonate is surface treated with at least one functionalized poly- and/or perfluorinated compound to obtain the poly- and/or perfluorinated compound treated calcium carbonate according to the invention.

Accordingly, the surface-treated calcium carbonate comprises a surface-treatment layer on at least a part of the surface of the calcium carbonate.

Upon contacting the calcium carbonate material with one or more functionalized poly- and/or perfluorinated compound, "salty reaction products of functionalized poly- and/or perfluorinated compound" are formed. Said salty reaction products are formed between the functionalized poly- and/or perfluorinated compound which is formed from the applied functionalized poly- and/or perfluorinated compound and reactive molecules located at the surface of the calcium carbonate-material.

In a preferred embodiment, the surface treated calcium comprises from 0.1 wt % to 10 wt %, preferably from 0.3 wt % to 8 wt %, more preferably 0.5 wt % to 5 wt %, even more preferably 0.9 wt % to 3 wt %, most preferably 1 wt % to 1.1 wt % of the at least one functionalized poly- and/or perfluorinated compound relative to the weight of calcium carbonate.

The term "at least one" functionalized poly- and/or perfluorinated compound in the meaning of the present invention means that the functionalized poly- and/or perfluorinated compound comprises, preferably consists of, one or more functionalized poly- and/or perfluorinated compound (s).

In one embodiment of the present invention, the at least one functionalized poly- and/or perfluorinated compound comprises, preferably consists of, one functionalized poly- or perfluorinated compound.

Alternatively, the at least one functionalized poly- and/or perfluorinated compound comprises, preferably consists of, two or more functionalized poly- and/or perfluorinated compounds. For example, the at least one functionalized poly- and/or perfluorinated compound comprises, preferably consists of, two or three functionalized poly- and/or perfluorinated compounds.

Preferably, the at least one functionalized poly- and/or perfluorinated compound comprises, more preferably consists of, one functionalized poly- and/or perfluorinated compound.

A "poly- and/or perfluorinated compound" in the meaning of the present invention is a compound containing fluorine, and preferably is poly- and/or perfluorinated, i.e. contains several or only carbon-fluorine bonds (no C—H bonds) and C—C bonds but also other heteroatoms.

It may be a poly- and/or perfluorinated alkyl compound, i.e. an alkyl compound containing fluorine, and preferably is poly- and/or perfluorinated, i.e. contains several or only carbon-fluorine bonds (no C—H bonds) and C—C bonds but also other heteroatoms It may also be a fluoropolymer, i.e. a polymer containing fluorine in its repeating units, and preferably is poly- and/or perfluorinated, i.e. contains several or only carbon-fluorine bonds (no C—H bonds) and C—C bonds but also other heteroatoms.

As used herein the term "polymer" generally includes homopolymers and co-polymers such as, for example, block, graft, random and alternating copolymers, as well as blends and modifications thereof. The polymer can be an amorphous polymer, a crystalline polymer, or a semi-crystalline polymer, i.e. a polymer comprising crystalline and amorphous fractions. The degree of crystallinity is specified in percent and can be determined by differential scanning calorimetry (DSC). An amorphous polymer may be characterized by its glass transition temperature and a crystalline polymer may be characterized by its melting point. A semi-crystalline polymer may be characterized by its glass transition temperature and/or its melting point.

The at least one functionalized poly- and/or perfluorinated compound preferably has at least one functional group, preferably at least two functional groups, more preferably at least one functional terminal group, even more preferably at least two functional terminal groups, which may be the same or different.

Accordingly, in a preferred embodiment the functionalized poly- and/or perfluorinated compound has one functional group, preferably a terminal functional group.

In another preferred embodiment, the functionalized poly- and/or perfluorinated compound has two functional groups, preferably two terminal functional groups.

It is also possible that the functionalized poly- and/or perfluorinated compound has non-terminal functional groups or terminal and non-terminal functional groups.

Generally, if the functionalized poly- and/or perfluorinated compound has more than one functional group, the groups may be the same or different.

A functional group in the meaning of the present invention is in line with conventional definitions of a functional group, i.e. is a specific substituent within the poly- and/or perfluorinated compound that is responsible for the characteristic chemical reactions of this poly- and/or perfluorinated compound. The same functional group will undergo the same or similar chemical reaction regardless of the size of the molecule it is a part of. Functional groups are groups of one or more atoms of distinctive chemical properties no matter what they are attached to. For repeating units of polymers, functional groups attach to their nonpolar core of carbon atoms and thus add chemical character to carbon chains. Functional groups can also be charged, e.g. in carboxylate salts (—COO$^-$), which turns the molecule into a polyatomic ion or a complex ion.

The at least one functionalized poly- and/or perfluorinated compound according to the invention may be selected from the group comprising poly- and/or perfluorinated alkyl compounds having at least one functional group, and, in an especially preferred embodiment is a functionalized fluoropolymer, i.e. a polymer containing fluorine in its repeating units, which is poly- and/or perfluorinated and has at least one functional group.

Preferably, the at least one functionalized poly- and/or perfluorinated compound is selected from the group comprising linear poly- and/or perfluorinated alkyl compounds having at least one functional group.

In an especially preferred embodiment, the at least one functionalized poly- and/or perfluorinated compound is a poly- and/or perfluorinated alkyl compound having one functional group, more preferably one terminal functional group.

It may also be advantageous, that the at least one functionalized poly- and/or perfluorinated compound is a poly- and/or perfluorinated alkyl compound having two functional groups, preferably two terminal functional groups.

The at least one functionalized poly- and/or perfluorinated compound preferably is selected from the group comprising poly- and/or perfluorinated alkyl compounds having at least one functional group, which is selected from the group comprising hydroxyl; carboxyl; alkoxy, preferably methoxy and ethoxy; alkoxycarbonyl, preferably methoxycarbonyl and ethoxycarbonyl; methylene alcohol, allyl ether, amino; ammonio; carboxamido; sulfanyl; sulfonyl; sulfo; alkoxysulfonyl; salts, derivatives and mixtures thereof.

In a preferred embodiment, the at least one functionalized poly- and/or perfluorinated compound is selected from the group comprising functionalized poly- and/or perfluoropolyethers, poly- and/or perfluorocarboxylic acids, poly- and/or perfluorosulfonic acids, their salts, derivatives and mixtures thereof.

In an especially preferred embodiment, the at least one functionalized poly- and/or perfluorinated compound is selected from the group comprising functionalized poly- and/or perfluoropolyethers having at least one functional group, preferably at least one terminal functional group, more preferably at least one terminal functional group selected from the group comprising a carboxyl group, a phosphate ester group, a hydroxy group, their salts, derivatives and mixtures thereof, and is most preferably selected from the group comprising poly(hexafluoropropylene oxide)s having a terminal carboxyl group located on the terminal fluoromethylene group thereof, or a bifunctional perfluoropolyether ammonium phosphate salt.

Also suitable for the use in the present invention may be functionalized poly- and/or perfluorinated compounds selected from the group comprising poly- and/or perfluorocarboxylic acids, preferably perfluoroheptanoic acid (PFHpA), perfluorooctanoic acid (PFOA), perfluorononanoic acid (PFNA), perfluorodecanoic acid (PFDA), perfluorododecanoic acid, perfluorooctane sulfonate (PFOS), perfluorooctane sulfonamide (PFOSA), perfluorobutane sulfonic acid (PFBS), perfluorohexane sulfonic acid (PFHxS), heptafluorobutyric acid (HFBA), their salts, derivatives and mixtures thereof.

In another embodiment, the at least one functionalized poly- and/or perfluorinated compound may be selected from the group comprising poly- and/or perfluorosulfonic acids, preferably perfluorobutanesulfonic acid (PFBS), perfluorobutane sulfonamide (FBSA), perfluorooctanesulfonamide (PFOSA), perfluorooctanesulfonic acid (PFOS), their salts, derivatives and mixtures thereof.

It is especially preferred that the at least one functionalized poly- and/or perfluorinated compound is selected from the group comprising fluorocarbon ether polymers of poly (hexafluoropropylene oxide), preferably from the group comprising poly(hexafluoropropylene oxide)s with a chemical formula F—(CF(CF$_3$)—CF$_2$—O)$_n$—CF$_2$CF$_3$, wherein n is 10-60, which may be functionalized by a terminal functional group, more preferably from the group comprising poly(hexafluoropropylene oxide)s with a chemical formula F—(CF(CF$_3$)—CF$_2$—O)$_n$—CF$_2$CF$_3$, wherein n is 10-60, which are functionalized with a carboxylic acid group situated on the terminal fluoromethylene group and have molecular weights of about 2500 to 7500 g/mole.

One especially preferred group of functionalized poly- and/or perfluorinated compounds is the group of colourless synthetic lubricants (oils and greases) marketed under the trademark Krytox™ by The Chemours Company/DuPont. Krytox™ oils are fluorocarbon ether polymers of polyhexafluoropropylene oxide, with a chemical formula: F—(CF(CF$_3$)—CF$_2$—O)$_n$—CF$_2$CF$_3$, wherein n=10-60, which may be functionalized by a terminal functional group.

Suitable for the use in the present invention are functionalized Krytox™ compounds such as Krytox™ 157FS(L) and Krytox™ 157FS(H), which are poly(hexafluoropropylene oxide) functionalized with a carboxylic acid group situated on the terminal fluoromethylene group having molecular weights of about 2500 and 7000-7500 g/mole, respectively.

Also, especially preferred in the present invention is the use of at least one functionalized poly- and/or perfluorinated compound being selected from the group comprising functionalized poly- and/or perfluoropolyethers having two terminal functional group, more preferably two terminal functional groups selected from the group comprising a carboxyl group, a phosphate ester group, a hydroxy group, their salts, derivatives and mixtures thereof.

For example, fluoropolyether marketed under the tradename Fluorolink® by Solvay are useful in the present invention. These compounds are bifunctional fluoropolyethers having the formula X—$CF_2O$—$(CF_2CF_2O)_m$—$(CF_2O)_n$—$OCF_2$—X, wherein m and n=0.8-4, AMU=1000-4000, for example Fluorolink® P54, an aqueous emulsion of a fluoropolyether ammonium phosphate salt.

A further aspect of the present invention is a process for preparing the fluorinated compound treated calcium carbonate as described above, which is characterized by the steps of
providing at least one calcium carbonate,
providing at least one functionalized poly- and/or perfluorinated compound,
combining the at least one calcium carbonate and the at least one functionalized poly- and/or perfluorinated compound.

The calcium carbonate and the at least one functionalized poly- and/or perfluorinated compound may independently from each other be provided in a dry form or in the form of a slurry, dispersion, emulsion or solution.

The calcium carbonate preferably is provided in a dry form or in the form of a slurry such as in the form of an aqueous slurry.

A "suspension" or "slurry" in the meaning of the present invention comprises undissolved solids and a liquid medium, preferably water, and optionally further additives, and usually contains large amounts of solids and, thus, is more viscous and can be of higher density than the liquid from which it is formed.

The term "aqueous" suspension or slurry refers to a system, wherein the liquid phase comprises, preferably consists of, water. However, said term does not exclude that the liquid phase of the aqueous suspension comprises minor amounts of at least one water-miscible organic solvent selected from the group comprising methanol, ethanol, acetone, acetonitrile, tetrahydrofuran and mixtures thereof. If the aqueous suspension comprises at least one water-miscible organic solvent, the liquid phase of the aqueous suspension comprises the at least one water-miscible organic solvent in an amount of from 0.1 to 40.0 wt.-% preferably from 0.1 to 30.0 wt.-%, more preferably from 0.1 to 20.0 wt.-% and most preferably from 0.1 to 10.0 wt.-%, based on the total weight of the liquid phase of the aqueous suspension. For example, the liquid phase of the aqueous suspension consists of water.

In one preferred embodiment, the calcium carbonate is conditioned before combining it with the at least one functionalized poly- and/or perfluorinated compound.

Conditioning in the meaning of the present invention means that the at last one calcium carbonate is stirred for a certain time. This may be advantageous, e.g. for the deagglomeration of the calcium carbonate.

Stirring may be carried out at room temperature or at elevated temperatures, e.g. at a temperature of from 20° C. to 130° C., more preferably at a temperature of from 25° C. to 120° C., even more preferably at a temperature of from 40° C. to 90° C., most preferably at a temperature of from 60° C. to 80° C.

As regards the step of combining the at least one calcium carbonate with the at least one functionalized poly- and/or perfluorinated compound, it is especially preferred that the at least one functionalized poly- and/or perfluorinated compound is liquid or provided in a liquid form, e.g. in the form of a solution, emulsion or suspension, and added dropwise and/or in small portions to the at least one calcium carbonate, which may be in a dry form, or in the form of a slurry, preferably an aqueous slurry.

In a preferred embodiment, the at least one functionalized poly- and/or perfluorinated compound is combined with the at least one calcium carbonate in an amount of from 0.1 wt % to 10 wt %, preferably from 0.2 wt % to 8 wt %, more preferably 0.3 wt % to 5 wt %, even more preferably 0.4 wt % to 3 wt %, especially preferably 0.5 to 2 wt %, most preferably 0.7 wt % to 1 wt % relative to the weight of calcium carbonate.

Further preferred amounts of the at least one functionalized fluoropolymer are from 0.1 wt % to 10 wt %, preferably from 0.2 wt % to 8 wt %, more preferably 0.3 wt % to 5 wt %, even more preferably 0.4 wt % to 3 wt %, most preferably 0.5 wt % to 2 wt % relative to the weight of calcium carbonate.

The combination step preferably is carried out under stirring.

In a more preferred embodiment, dry ground calcium carbonate having a weight median particle diameter $d_{50}$ of 1.5 to 2.0 µm, a $d_{98}$ of 6.0 to 8.0 µm, and a BET specific surface area of 3.3 to 4.8 $m^2/g$, is combined with 1 wt % (relative to the calcium carbonate amount) of a poly (hexafluoropropylene oxide) functionalized with a carboxylic acid group situated on the terminal fluoromethylene group, such as the product obtainable from Chemours under the tradename Krytox® 157FS(L).

In a further more preferred embodiment, wet ground and spray dried calcium carbonate having a weight median particle diameter $d_{50}$ of 0.5 to 0.9 µm, a $d_{98}$ of 2.4 to 3.5 µm, and a BET specific surface area of 7.0 to 9.0 $m^2/g$, is combined with 1 wt % (relative to the calcium carbonate amount) of a poly(hexafluoropropylene oxide) functionalized with a carboxylic acid group situated on the terminal fluoromethylene group, such as the product obtainable from Chemours under the tradename Krytox® 157FS(L).

In an especially preferred embodiment, dry ground calcium carbonate having a weight median particle diameter $d_{50}$ of 1.8 µm, a $d_{98}$ of 7.4 µm, and a BET specific surface area of 4.1 $m^2/g$, is combined with 1 wt % (relative to the calcium carbonate amount) of a poly(hexafluoropropylene oxide) functionalized with a carboxylic acid group situated on the terminal fluoromethylene group, such as the product obtainable from Chemours under the tradename Krytox® 157FS(L).

In a further preferred embodiment, wet ground and spray dried calcium carbonate having a weight median particle diameter $d_{50}$ of 0.7 µm, a $d_{98}$ of 2.9 µm, and a BET specific surface area of 7.9 $m^2/g$, is combined with 2 wt % (relative to the calcium carbonate amount) of a poly(hexafluoropropylene oxide) functionalized with a carboxylic acid group situated on the terminal fluoromethylene group, such as the product obtainable from Chemours under the tradename Krytox® 157FS(L).

After combining the at least one calcium carbonate and the at least one functionalized poly- and/or perfluorinated compound, it is preferred to further stir the mixture. In this respect, it is especially preferred to stir the mixture for a few seconds up to one or two hours, e.g. for 5 seconds to 180 min, preferably 1 min to 120 min, more preferably 5 min to 100 min, even more preferably 10 min to 80 min, especially 20 min to 60 min, most preferably 30 min to 40 min.

Stirring is preferably carried out at the temperature of the combination step, but may also be carried out at a higher or lower temperature.

Stirring may be carried out by any equipment suitable therefor, e.g. by a hispeed mixer or pin mill, or by means of a Somakon MP-LB Mixer (Somakon Verfahrenstechnik, Germany).

After combining, and optionally further stirring the mixture of at least one calcium carbonate and at least one functionalized poly- and/or perfluorinated compound, the poly- and/or perfluorinated compound treated calcium carbonate is obtained.

The poly- and/or perfluorinated compound treated calcium carbonate may be dried. Drying may be carried out by conventional drying methods, e.g. by thermal drying methods such as in an oven, by jet- or spray drying.

Unless specified otherwise, the term "drying" refers to a process according to which at least a portion of solvent such as water is removed from a material to be dried such that a constant weight of the obtained "dried" material at 150° C. is reached.

Moreover, a "dried" or "dry" material may be defined by its total moisture content which, unless specified otherwise, is less than or equal to 5.0 wt. %, preferably is less than or equal to 1.0 wt.-%, more preferably less than or equal to 0.5 wt.-%, even more preferably less than or equal to 0.2 wt.-%, and most preferably between 0.03 and 0.07 wt.-%, based on the total weight of the dried material.

The obtained poly- and/or perfluorinated compound treated calcium carbonate may be deagglomerated. This deagglomeration step may be carried out in any equipment suitable therefor, preferably in a centrifuge, pin mill, high speed mixer or attritor mill.

If the poly- and/or perfluorinated compound treated calcium carbonate is dried, the deagglomeration step may be carried out before, during or after drying.

The poly- and/or perfluorinated compound treated calcium carbonate obtained by this process is a further aspect of this invention.

A still further aspect is the use of the inventive poly- and/or perfluorinated compound treated calcium carbonate as a filler and/or surface coating agent, preferably in polymers.

Especially preferred polymers in which the inventive poly- and/or perfluorinated compound treated calcium carbonate may be used are selected from the group comprising acrylonitrile butadiene styrenes (ABS), polyamides (PA), such as PA46, PA66, PA6, polybutylene terephthalates (PBT), polycarbonates (PC), polyethylene terephthalates (PET), polyimides, polyoxymethylene plastics (POM/acetal), polyphenylene sulfides (PPS), polyphenylene oxides (PPO), poly(ethylene succinate)s (PES), polyethylenimins (PEI), polystyrenes (PS), poly(methyl methacrylate)s (PMMA), thermoplastic elastomers (TPE), derivatives, and mixtures thereof.

The present invention also relates to fillers comprising the poly- and/or perfluorinated compound treated calcium carbonate.

Furthermore, the present invention relates to surface coating compositions comprising the poly- and/or perfluorinated compound treated calcium carbonate.

In view of the excellent properties of the inventive poly- and/or perfluorinated compound treated calcium carbonate in polymers, a further aspect of the present invention is a polymer comprising the poly- and/or perfluorinated compound treated calcium carbonate according to the invention.

In a preferred embodiment, the polymers comprising the poly- and/or perfluorinated compound treated calcium carbonate according to the invention are selected from the group comprising acrylonitrile butadiene styrenes (ABS), polyamides (PA), such as PA46, PA66, PA6, polybutylene terephthalates (PBT), polycarbonates (PC), polyethylene terephthalates (PET), polyimides, polyoxymethylene plastics (POM/acetal), polyphenylene sulfides (PPS), polyphenylene oxides (PPO), poly(ethylene succinate)s (PES), polyethylenimins (PEI), polystyrenes (PS), poly(methyl methacrylat)s (PMMA), thermoplastic elastomers (TPE), derivatives, and mixtures thereof.

The following examples and tests will illustrate the present invention, but are not intended to limit the invention in any way.

EXAMPLES

1. Analytical Methods:
Particle Size Distribution (Mass % Particles with a Diameter<X) and Weight Median Diameter ($d_{50}$) of a Particulate Material Particle sizes were determined by using a Sedigraph™ 5120 instrument of Micromeritics Instrument Corporation. The method and the instrument are known to the skilled person and are commonly used to determine the particle size of fillers and pigments. The measurements were carried out in an aqueous solution of 0.1 wt.-% $Na_4P_2O_7$. The samples are dispersed using a high speed stirrer and supersonics.
BET Specific Surface Area of a Material The "specific surface area" (expressed in $m^2/g$) of a material as used throughout the present document is determined by the Brunauer Emmett Teller (BET) method with nitrogen as adsorbing gas and by use of a ASAP 2460 instrument from Micromeritics. The method is well known to the skilled person and defined in ISO 9277:2010. Samples are conditioned at 100° C. under vacuum for a period of 30 min prior to measurement. The total surface area (in $m^2$) of said material can be obtained by multiplication of the specific surface area (in $m^2/g$) and the mass (in g) of the material.
Powder Flowability—Stability and Variable Flow Rate Method The Basic Flowability Energy (BFE), Stability Index (SI), Specific Energy (SE), Flow Rate Index (FRI) and Conditioned Bulk Density (CBD) are measured on a FT4 Powder Rheometer (Freeman Technology, UK) equipped with the Powder Rheometer software (v 5.000.00012) and Freeman Technology Data Analysis Software version 4.0.17, using the stability and variable flow rate method.

This method consists of filling a cylindrical vessel (25 mm×25 ml glass vessel).

The first stage of the test process is to obtain a homogeneous, conditioned powder state to allow highly repeatable measurements to be made. A conditioning cycle comprises the dynamic test blade slicing downward through the powder followed by an upward traverse that lifts the powder and drops it over the blade. This process helps to remove the effect of different sampling methodologies and powder storage times.

After that initial conditioning step, the powder volume is adjusted to the vessel size to remove excess powder ("split")—and the mass is recorded after the splitting step. Following that, 8 repeating cycles of conditioning and measurements with a 23.5 mm blade are performed. For each test cycle, the blade is inserted into the powder bed downward (anti-clockwise, tip speed −100 mm/s, helix angle=5°/target height 5 mm), and upward. For conditioning steps, the blade is inserted into the powder bed downwards (tip speed-40 mm/s/helix angle 5°, target height 5 mm), and upwards.

After those 8 tests, 3 more cycles of (conditioning+tests) are performed at variable flow rates, i.e. with a blade tip speed of 70 mm/s (Test 9), 40 mm/s (Test 10) and finally 10 mm/s (Test 11). The energy and torque are recorded and allow to calculate various flow parameters, defined as follow:

Basic flowability energy (BFE, mJ): Energy Cycle 7 (downwards)
Stability index: (Energy Test 7)/(Energy Cycle 1)
Specific energy (SE, mJ/g): (Up Energy cycle 6+Up Energy cycle 7)/(2×split mass)
Flow Rate Index (FRI): (Energy Test 11)/(Energy Test 8)
Conditioned bulk density (CBD, g/ml): (Split mass)/(Split volume)

Moisture Pick Up Susceptibility

The moisture pick up susceptibility of a material as referred to herein is determined in mg moisture/g after exposure to an atmosphere of 10% and 85% relative humidity, respectively, for 2.5 hours at a temperature of +23° C. (±2° C.). For this purpose, the sample is first kept at an atmosphere of 10% relative humidity for 2.5 hours, then the atmosphere is changed to 85% relative humidity at which the sample is kept for another 2.5 hours. The weight increase between 10% and 85% relative humidity is then used to calculate the moisture pick-up in mg moisture/g of sample.

Contact Angle Measurements

Contact angles were measured by image analysis using images taken with a Canon EOS 600D and EF 1:2.8 MP-E 65 mm 1-5× macro-lens on a Kaiser stand and daylight illumination. For each sample, 5 microdroplets (5 µl) of each test liquid (water and/or hexadecane and/or diiodomethane) were deposited on the samples in the form of tablets. Images were taken 20 s after applying the droplets. Contact angle and height and width were measured manually with the measurement tool of the ImageAccess database. Height and width were used to calculate contact angle of a spherical drop.

Surface Energy

The OCA 50 (DataPhysics Instruments GmbH, Filderstadt, Germany) is a measuring device for the analysis of the wettability of solid surfaces and the determination of the surface free energy of planar solids using the sessile drop technique. A high-speed microscope camera captures the evolution of the droplet configuration overtime after it is deposited on the surface. Image analysis and chosen curvature fitting software can be applied in relation to a user-defined linear continuous liquid-solid interface to determine the droplet meniscus shape, droplet volume and contact angle with the surface. By using various relevant liquids having defined polar and dispersive surface energy components (water, diiodomethane and ethylene glycol), it is possible to derive a measure of the surface energy of the solid according to the method of Owens, Wendt, Rabel and Kalble (OWRK) (1-3).

Tensile Properties

The tensile properties are measured according to ISO527-1:2012 Type BA(1:2) on an Allround Z020 traction device from Zwick Roell. Measurements are performed with an initial load of 0.1 MPa. For the measurement of the E-modulus, a speed of 1 mm/min is used, then it is increased to 500 mm/min. The tensile strain at break is obtained under standard conditions. All measurements are performed on samples that have been stored under similar conditions after preparation.

Impact Properties

The impact properties are measured according to ISO 179-1eU:2010-11 on a HIT5.5P device from Zwick Roell. Measurements are performed on un-notched samples with a hammer of 5J. All measurements are performed on samples that have been stored under similar conditions after preparation.

Thermal Conductivity

Thermal conductivity was measured with the Hot Disk TPS system according to ISO 22007-2:2008-12 Plastics—Determination of thermal conductivity and thermal diffusivity—transient plane heat source (hot disc) method under the following conditions:

Hot Disk TPS 3500+software module ANISOTROPIC
Kapton sensor 5465 (3.189 mm rayon)
measuring temperature: 22° C.±1° C.; 155° C.±1° C.

2. Material

Calcium Carbonate Powders

CC 1

CC 1 is dry ground calcium carbonate (marble) from Italy ($d_{50}$=1.8 µm, $d_{98}$=7.4 µm; BET=4.1 m²/g)

CC 2

CC 2 is a dry ground calcium carbonate (marble) from Italy ($d_{50}$=3.4 µm, $d_{98}$=13.8 µm; BET=2.6 m²/g)

CC 3

CC 3 is a wet ground and spray dried calcium carbonate (marble) from Italy (sedigraph: $d_{50}$=1.9 µm, $d_{98}$=5.8 µm; BET=2.9 m²/g)

CC 4

CC 4 is a wet ground and spray dried calcium carbonate (limestone) from France (sedigraph: $d_{50}$=0.7 µm, $d_{98}$=2.9 µm; BET=7.9 m²/g)

Treatment Agents

Treatment Agent A

Treatment agent A is a poly(hexafluoropropylene oxide) functionalized with a carboxylic acid group situated on the terminal fluoromethylene group. It can be obtained from Chemours under tradename Krytox® 157FS(L). Molecular weight: ca. 2500 Da, viscosity (cSt, 40° C.): 99.4-149, TAN (Total Acid Number according to ASTM D664) (mg KOH/g): 23-27, density (g/ml, −9° C.): 1.91.

Treatment Agent B

Treatment agent B is a poly(hexafluoropropylene oxide) functionalized with a carboxylic acid group situated on the terminal fluoromethylene group. It can be obtained from Chemours under tradename Krytox® 157FS(H). Molecular weight: 7000-7500 Da, viscosity (cSt, 40° C.): 703-1055, TAN (Total Acid Number according to ASTM D664) (mg KOH/g): 8-10, density (g/ml, −9° C.): 1.91.

Treatment Agent C

Treatment agent C is an aqueous emulsion of a fluoropolyether ammonium phosphate salt. It can be obtained from Solvay under tradename Fluorolink® P54. Dry content: 20 wt %, density: 1.1. Color: clear amber solution.

Treatment Agent D

Treatment agent D is perfluorododecanoic acid from Fluorochem Ltd (CAS: 307-55-1, Mw=614.1 g/mole, mp=107-109° C.)

Treatment Agent E

Treatment agent E is perfluorooctanoic acid from Fluorochem Ltd (CAS: 335-67-1, Mw=414.1 g/mole, mp=40-50° C.)

Treatment Agent F

Treatment agent F is a mono-substituted alkenyl succinic anhydride (2,5-furandione, dihydro-, mono-$C_{15-20}$-alkenyl derivatives, CAS No. 68784-12-3), which is a blend of mainly branched octadecenyl succinic anhydrides (CAS #28777-98-2) and mainly branched hexadecenyl succinic anhydrides (CAS #32072-96-1). More than 80% of the blend is branched octadecenyl succinic anhydrides. The purity of the blend is >95 wt %. The residual olefin content is below 3 wt %.

Treatment Agent G

Treatment agent G is a fatty acid mixture, which consists of a 1:1 mixture of stearic acid and palmitic acid. Such surface treatment is known to the skilled person, e.g. from WO 2010/030579 referring to stearic acid treated calcium carbonate having low or no detectable free stearic acid. The method for treating calcium carbonate includes the combination of calcium carbonate, water and stearic acid, wherein the amount of water is at least 0.1% by weight relative to the total weight.

The following products were obtained by treatment with treatment agents A-G and summarized in table 1.

Compound Treated Calcium Carbonates (Comparative)

CCC 1

CCC 1 is CC 1 treated with treatment agent G. CCC 1 was prepared in a high speed mixer (Somakon MP-LB Mixer, Somakon Verfahrenstechnik, Germany) by surface-treating CC 1. For that purpose, CC 1 (1 kg) was first conditioned in the high speed mixer by stirring for 5 minutes at 120° C. (1000 rpm). After that time, treatment agent G (1.1 wt % relative to the calcium carbonate amount) was added dropwise to the mixture and stirring and heating was then continued for another 10 minutes at 120° C. (1000 rpm). After that time, the mixture was allowed to cool and the treated CCC 1 was collected.

CCC 2

CCC 2 is CC 2 treated with treatment agent G. CCC 2 was prepared in a high speed mixer (Somakon MP-LB Mixer, Somakon Verfahrenstechnik, Germany) by surface-treating CC 2. For that purpose, CC 2 (1 kg) was first conditioned in the high speed mixer by stirring for 5 minutes at 120° C. (1000 rpm). After that time, treatment agent G (0.6 wt % relative to the calcium carbonate amount) was added dropwise to the mixture and stirring and heating was then continued for another 10 minutes at 120° C. (1000 rpm). After that time, the mixture was allowed to cool and the treated CCC 2 was collected Poly- and/or Perfluorinated Compound Treated Calcium Carbonates (Inventive)

FCCC 3

FCCC 3 was prepared in a high speed mixer (Somakon MP-LB Mixer, Somakon Verfahrenstechnik, Germany) by surface-treating CC 1. For that purpose, CC 1 (1 kg) was first conditioned in the high speed mixer by stirring for 5 minutes at 80° C. (1000 rpm). After that time, treatment agent A (0.5 wt % relative to the calcium carbonate amount) was added dropwise to the mixture and stirring and heating was then continued for another 10 minutes at 80° C. (1000 rpm). After that time, the mixture was allowed to cool and treated FCCC 3 was collected.

FCCC 4

FCCC 4 was prepared in a high speed mixer (Somakon MP-LB Mixer, Somakon Verfahrenstechnik, Germany) by surface-treating CC 1. For that purpose, CC 1 (1 kg) was first conditioned in the high speed mixer by stirring for 5 minutes at 80° C. (1000 rpm). After that time, treatment agent A (1 wt % relative to the calcium carbonate amount) was added dropwise to the mixture and stirring and heating was then continued for another 10 minutes at 80° C. (1000 rpm). After that time, the mixture was allowed to cool and treated FCCC 4 was collected.

FCCC 5

FCCC 5 was prepared in a high speed mixer (Somakon MP-LB Mixer, Somakon Verfahrenstechnik, Germany) by surface-treating CC 1. For that purpose, CC 1 (1 kg) was first conditioned in the high speed mixer by stirring for 5 minutes at room temperature (1000 rpm). After that time, treatment agent A (1 wt % relative to the calcium carbonate amount) was added dropwise to the mixture and stirring was then continued for another 10 minutes at room temperature (1000 rpm). After that time, treated FCCC 5 was collected.

FCCC 6

FCCC 6 was prepared in a high speed mixer (Somakon MP-LB Mixer, Somakon Verfahrenstechnik, Germany) by surface-treating CC 1. For that purpose, CC 1 (1 kg) was first conditioned in the high speed mixer by stirring for 5 minutes at 120° C. (1000 rpm). After that time, treatment agent A (0.5 wt % relative to the calcium carbonate amount) and treatment agent F (0.5 wt % relative to the amount of calcium carbonate) was added dropwise to the mixture and stirring and heating was then continued for another 10 minutes at 120° C. (1000 rpm). After that time, the mixture was allowed to cool and the treated FCCC 6 was collected.

FCCC 7

FCCC 7 was prepared in a 10 l batch reactor by surface treatment of CC 1. For that purpose, a suspension of CC 1 (2.5 kg) in deionized water (5 l) was prepared at room temperature. After that, under strong stirring, treatment agent A (0.5 wt % relative to the calcium carbonate amount) was added and stirring was continued for 2 h. The slurry was then dried overnight in the oven (110° C.) and deagglomerated 2 times on Retsch SR300 rotor beater mill (9000 rpm), from Retsch GmbH, Germany.

FCCC 8

FCCC 8 was prepared in a 10 l batch reactor by surface treatment of CC 1. For that purpose, a suspension of CC 1 (2.5 kg) in deionized water (5 l) was prepared at room temperature. After that, under strong stirring, treatment agent A (1 wt % relative to the calcium carbonate amount) was added and stirring was continued for 2 h. The slurry was then dried overnight in the oven (110° C.) and deagglomerated 2 times on Retsch SR300 rotor beater mill (9000 rpm), from Retsch GmbH, Germany.

FCCC 9

1 kg of CC 3 was placed in a high speed mixer (MTI Mixer, MTI Mischtechnik International GmbH, Germany), and conditioned by stirring for 10 minutes (3000 rpm, 120° C.). After that, treatment agent B (2 wt % relative to the amount of calcium carbonate) was introduced and stirring was continued for another 20 minutes (120° C., 3000 rpm). After that time, the treated powder was taken out (FCCC 9).

FCCC10

1 kg of CC 2 was placed in a high speed mixer (MTI Mixer, MTI Mischtechnik International GmbH, Germany), and conditioned by stirring for 10 minutes (3000 rpm, 120° C.). After that, treatment agent B (1.1 wt % relative to the amount of calcium carbonate) was introduced and stirring was continued for another 20 minutes (120° C., 3000 rpm). After that time, the treated powder was taken out (FCCC 10).

FCCC 11

1 kg of CC 2 was placed in a high speed mixer (MTI Mixer, MTI Mischtechnik International GmbH, Germany), and conditioned by stirring for 10 minutes (3000 rpm, 120° C.). After that, treatment agent C (1.1 wt % relative to the amount of calcium carbonate) was introduced and stirring was continued for another 20 minutes (120° C., 3000 rpm). After that time, the treated powder was taken out (FCCC 11).

FCCC 12

0.7 kg of CC 2 was placed in a high speed mixer (MTI Mixer, MTI Mischtechnik International GmbH, Germany), and conditioned by stirring for 10 minutes (3000 rpm, 140° C.). After that, treatment agent D (1.1 wt % relative to the amount of calcium carbonate) was introduced and stirring was continued for another 20 minutes (140° C., 3000 rpm). After that time, the treated powder was allowed to cool down and taken out of the mixer (FCCC 12).

FCCC 13

0.7 kg of CC 2 was placed in a high speed mixer (MTI Mixer, MTI Mischtechnik International GmbH, Germany), and conditioned by stirring for 10 minutes (3000 rpm, 90° C.). After that, treatment agent E (0.9 wt % relative to the amount of calcium carbonate) was introduced and stirring was continued for another 20 minutes (90° C., 3000 rpm). After that time, the treated powder was taken out (FCCC 13).

FCCC14

FCCC 14 was prepared in a high speed mixer (Somakon MP-LB Mixer, Somakon Verfahrenstechnik, Germany) by surface-treating CC 1. For that purpose, CC 1 (0.5 kg) was first conditioned in the high speed mixer by stirring for 5 minutes at 80° C. (1000 rpm). After that time, Treatment agent A (3 wt % relative to the calcium carbonate amount) was added dropwise to the mixture and stirring and heating was then continued for another 10 minutes at 80° C. (1000 rpm). After that time, the mixture was allowed to cool and the treated FCCC 14 was collected.

FCCC 15

FCCC 15 was prepared in a 10 l batch reactor by surface treatment of CC 1. For that purpose, a suspension of CC 1 (2 kg) in deionized water (5 l) was prepared at room temperature. After that, under strong stirring (1000 rpm), treatment agent A (0.5 wt % relative to the calcium carbonate amount), which has been mixed with deionized water at a mass concentration of 1:20 was added dropwise and stirring was continued for 40 min. The slurry was then spray dried at 200° C. and two times deagglomerated in an ultra-centrifugal mill ZM200 from Retsch GmbH, Germany.

FCCC 16

FCCC 16 was prepared in a 10 l batch reactor by surface treatment of CC 1. For that purpose, a suspension of CC 1 (2 kg) in deionized water (5 l) was prepared at room temperature. After that, under strong stirring (1000 rpm), treatment agent A (0.5 wt % relative to the calcium carbonate amount), which has been mixed with deionized water at a mass concentration of 1:20 was added dropwise and stirring was continued for 40 min. The slurry was then filter pressed at 2-2.5 bar and dried overnight in an oven (160° C.) and deagglomerated two times in an ultra-centrifugal mill ZM200 from Retsch GmbH, Germany.

FCCC 17

FCCC 17 is CC 4 treated with treatment agent A. FCCC 17 was prepared in a high speed mixer (Somakon MP-LB Mixer, Somakon Verfahrenstechnik, Germany) by surface-treating CC 4. For that purpose, CC 4 (2 kg) was first conditioned in the high speed mixer by stirring for 5 minutes at 100° C. (600 rpm). After that time, treatment agent A (2 wt % relative to the calcium carbonate amount) was added dropwise to the mixture and stirring and heating was then continued for another 10 minutes at 100° C. (600 rpm). After that time, the mixture was allowed to cool and the treated FCCC 17 was collected.

TABLE 1

| Powder | CaCO$_3$ | Treatment agent 1 (wt %)* | Treatment agent 2 (wt %)* | Dry or wet treatment | T ° of treatment |
|---|---|---|---|---|---|
| CCC 1 | CC 1 | G (1.1%) | — | | |
| CCC 2 | CC 2 | G (0.6%) | — | | |
| FCCC 3 | CC 1 | A (0.5%) | — | dry | 80° C. |
| FCCC 4 | CC 1 | A (1%) | — | dry | 80° C. |
| FCCC 5 | CC 1 | A (1%) | — | dry | room temp. |
| FCCC 6 | CC 1 | A (0.5%) | F (0.5%) | dry | 120° C. |
| FCCC 7 | CC 1 | A (0.5%) | — | wet | room temp. |
| FCCC 8 | CC 1 | A (1%) | — | wet | room temp. |
| FCCC 9 | CC 3 | B (2%) | — | dry | 120° C. |
| FCCC 10 | CC 2 | B (1.1%) | — | dry | 120° C. |
| FCCC 11 | CC 2 | C (1.1%) | — | dry | 120° C. |
| FCCC 12 | CC 2 | D (1.1%) | — | dry | 140° C. |
| FCCC 13 | CC 2 | E (0.9%) | — | dry | 90° C. |
| FCCC 14 | CC 1 | A (3%) | — | dry | 80° C. |
| FCCC 15 | CC 1 | A (0.5%) | — | wet | room temp. |
| FCCC 16 | CC 1 | A (0.5%) | — | wet | room temp. |
| FCCC 17 | CC 4 | A (2%) | — | dry | 100° C. |

*relative to the amount of calcium carbonate

Resins/Polymers to be Filled

PA66: Rhodia Technyl A 205F Natural: an unreinforced polyamide 66 for injection moulding PC: Polycarbonate: Resinex PC Calibre 201-22, from Trinseo LLC, United States PET: Polyethylene terephthalate: T-209 serie PC/PBT: Polycarbonate/Polybutylene terephthalate: Albis Pocan B7616

Other Compounds

PTFE: Polytetrafluoroethylene: Compound RTP 300 TFE 10, 15 and 20

Baryte: Barium sulfate: CAS 7727-43-7

Silicone: Compound RTP305 TFE13 S12

GE: Glass Eibre: Resinex Sikoclar E51.20, 30

Compounding

For evaluating the effects of the inventive fluorinated compound treated calcium carbonate fillers, the above described samples were introduced into several types of polymers by compounding.

Buss Compounding: 50% wt. CaCO$_3$
Compounder: Co-rotating twin-screw, Type: Clextral, Evolum HT32
Screw: 32 mm, L/D ratio: 44, Output: 10-40 kg/hr, max. 100 kg/hr
Temperature: PBT: 260° C., PA66: 280° C., PC: 290° C.

Moulding

"Primitive" Injection molding on TSI PO Netstal—T: 290° C.
Technology: Injection molding, Type: Engel EM440/150
Sschliesskraft: 1500 KN, Screw diameter: 35 mm
Volume injected max: 168 cm3, Pressure max: 2800 bar
Temperature: PBT: 260° C., PA66: 280° C., PC: 290° C.

3. Treatment Effects 3.1. Powder Flowability

Powder flowability tests are summarized in table 2.

TABLE 2

| Powder | BFE, [mJ] | CBD, [g/ml] |
|---|---|---|
| CC 1 | 87.88 | 0.50 |
| FCCC 3 | 82.64 | 0.55 |
| FCCC 4 | 78.65 | 0.58 |
| FCCC 14 | 48.74 | 0.58 |

It can be seen that the treatment with the perfluorinated additive improves powder flowability (lower BFE values) and increases bulk density (higher CBD values). This can be an advantage for processing and shipping.

3.2. Moisture Pickup

The moisture pickup of some of the poly- and/or perfluorinated compound treated calcium carbonates described above was investigated.

As can be seen from table 3, the inventive samples show reduced moisture pick-up compared to the corresponding untreated references, which is an advantageous effect in view of their use as fillers in polymers.

TABLE 3

| Powder | Moisture Pickup (mg/g) | Compare with | |
|---|---|---|---|
| CC 1 | 2.4 | — | |
| CC 2 | 2 | — | |
| CC 3 | 1.5 | — | |
| CC 4 | 2.9 | — | |
| FCCC 5 | 1.8 | CC 1 | Inventive |
| FCCC 7 | 1.2 | CC 1 | Inventive |
| FCCC 8 | 1.6 | CC 1 | Inventive |
| FCCC 9 | 1.1 | CC 3 | Inventive |
| FCCC 10 | 1.2 | CC 2 | Inventive |
| FCCC 11 | 1.7 | CC 2 | Inventive |
| FCCC 12 | 1 | CC 2 | Inventive |
| FCCC 13 | 1.6 | CC 2 | Inventive |
| FCCC 17 | 2.3 | CC 4 | Inventive |

3.2. Contact Angles and Surface Energy (Hydrophobicity and Lipophobicity)

Contact Angles of Poly- and/or Perfluorinated Compound Treated Calcium Carbonate To evaluate the hydrophobicity and lipophobicity of the poly- and/or perfluorinated compound treated calcium carbonates, tablets were prepared by compaction.

Tablet Preparation:

Tablets were prepared on a Herzog press TP40/2D (from HERZOG Maschinenfabrik GmbH & Co. KG, Germany) manually operated hydraulic press with 11 g of powder, which were compressed at 300 kN for 1 minute. The hydraulic pump is operated by a hand lever. A threaded spindle serves as a counter-bearing surface to provide a stable bed for the sample against the compacting pressure and to reduce the no-load stroke. The tablet was left in the metal cup used for tablet preparation.

For contact angle measurements, 3 tablets were prepared for the materials mentioned in table 4.

Contact Angles on Powder Tablets

Contact angles were measured by image analysis using images taken with a Canon EOS 600D and EF 1:2.8 MP-E 65 mm 1-5× macro-lens on a Kaiser stand and daylight illumination.

For each samples 5 microdroplets (5 μl) of each test liquids (water and hexadecane) were deposited on the tablets.

Images were taken 20 s after applying the droplets. Contact angle and height and width were measured manually with the measuring module of the ImageAccess database Image Access Version 8.

For some of the comparative examples, it was not possible to measure contact angles (values too low). The results are summarized in table 4.

TABLE 4

| | Water | | Hexadecane | | |
|---|---|---|---|---|---|
| Sample | Measured contact angle (°) | Calculated contact angle f(circle) (°) | Measured contact angle (°) | Calculated contact angle f(circle) (°) | |
| CC 2 | <10 (not measured) | <10 (not measured) | <10 (not measured) | <10 (not measured) | Comparative |
| CCC 2 | 142 +/− 3 | 134 +/− 2 | 21 +/− 4 | 10 +/− 1 | Comparative |
| FCCC 12 | 109 +/− 4 | 100 +/− 2 | 105 +/− 4 | 100 +/− 2 | Inventive |
| FCCC 13 | 84 +/− 9 | 82 +/− 1 | 87 +/− 1 | 82 +/− 1 | Inventive |

Table 3 shows that the inventive powders have both a hydrophobic and a lipophobic character, while the untreated powder is neither hydrophobic nor lipophobic, and the state-of-the art fatty acid treated reference is hydrophobic, but not lipophobic, as seen by the low contact angle with hexadecane.

Contact Angles on Coated Films

Coating colors were prepared with selected poly- and/or perfluorinated compound treated calcium carbonates and coated on superYUPO® foils from Fischer Papier AG, Switzerland (thickness 80 μm, size: 18×26 cm, 62 g/m$^2$, polypropylene) with a table coater. The composition of the coating colours and contact angles with hexadecane are summarized in table 5 below.

TABLE 5

| | | Coating colour composition | | | Measured |
|---|---|---|---|---|---|
| Example | Powder | CaCO$_3$ [parts] | Dispersing agent$^{a)}$ [parts, dry/dry] | Styronal D628 [parts, dry/dry] | Solid content$^{b)}$ [wt %] | contact angle with hexadecane (°) |
| Pap-1 | CC 3 | 100 | 0.23 | 6 | 27.4 | <10 |
| Pap-2 | FCCC 9 | 100 | 0.23 | 6 | 27.4 | 88 |

$^{a)}$Sodium-neutralised polyacrylate ($M_w$ = 3500 g/mole, pH = 8) was used as dispersing agent.
$^{b)}$Solid content was adjusted with deionized water.

It can be seen from table 4 that the treatment of calcium carbonate with a functionalized poly- and/or perfluorinated compound additive significantly increases contact angles with non-polar solvents (lipophobicity).

Contact Angles on Resins Filled with Poly- and/or Perfluorinated Compound Treated Calcium Carbonates Resins were filled with some of the above inventive poly- and/or perfluorinated compound treated calcium carbonates by compounding and further investigated as regards their surface properties. The results are shown in tables 6 to 9.

It can be seen from the given results that the treatment of calcium carbonate with poly- and/or perfluorinated compounds increases hydrophobicity of the resin filled therewith, wherein the surface energy is significantly decreased. This is especially important in view of the moulding properties of the resins, especially as regards problems of stickiness upon removal of the resin from the mould, which may be reduced.

This effect can be observed compared with the unfilled resin, as well as in comparison with resins filled with PTFE, as well as in combination with glass fibres.

TABLE 6

| | | Contact Angle (°) | | Surface Energy (mN · m$^{-1}$) | | |
|---|---|---|---|---|---|---|
| Resin | Compound (wt %)* | Water | Diiodo-methane | Total | Dispersive | Polar |
| PC | | 85.6 | 30.0 | 45.5 | 44.2 | 1.3 |
| + | 10% FCCC 4 (x2)** | 86.0 | 35.0 | 43.5 | 42.1 | 1.5 |
| | 50% FCCC 3 (x2)** | 98.4 | 47.5 | 35.7 | 35.7 | 0.2 |
| | 50% FCCC 4 (x2)** | 102.2 | 41.5 | 38.9 | 38.9 | 0.01 |
| + | 10% CC 1 (x2)** | 78.9 | 34.4 | 45.7 | 42.3 | 3.3 |

TABLE 6-continued

| | | Contact Angle (°) | | Surface Energy (mN · m$^{-1}$) | | |
|---|---|---|---|---|---|---|
| Resin | Compound (wt %)* | Water | Diiodo-methane | Total | Dispersive | Polar |
| + | 10% PTFE | 83.0 | 21.7 | 48.7 | 47.3 | 1.5 |
| | 15% PTFE | 84.3 | 30.3 | 45.7 | 44.1 | 1.6 |
| | 13% PTFE + 2% Silicone | 88.9 | 27.3 | 45.9 | 45.3 | 0.6 |
| | 10% PTFE + 5% FCCC 3 (x2)** | 89.2 | 33.8 | 43.4 | 42.6 | 0.8 |
| + | 30% GF | 83.9 | 30.0 | 44.4 | 42.4 | 2.0 |
| | 30% GF + 10% FCCC 3 | 83.1 | 35.0 | 40.7 | 37.8 | 2.8 |
| | 30% GF + 10% FCCC 4 | 89.3 | 34.4 | 41.0 | 39.9 | 1.1 |
| | 30% GF + 15% PTFE | 87.0 | 21.7 | 40.2 | 38.5 | 1.7 |
| | 30% GF + 10% PTFE + 5% FCCC 3 | 94.5 | 33.8 | 40.7 | 40.4 | 0.8 |
| | 30% GF + 13% PTFE + 2% Silicone | 90.5 | 27.3 | 39.7 | 38.8 | 1.0 |

*wt % based on the total amount of resin
**x2 means two times compounded

TABLE 7

| | Compound | Contact Angle (°) | | Total Surface |
|---|---|---|---|---|
| Resin | (wt %)* | Water | Diiodomethane | Energy (mN · m$^{-1}$) |
| PA66 | — | 73.7 | 40.6 | 42.5 |
| | +10% FCCC 3 | 73.8 | | |
| | +15% FCCC 3 | 72.3 | | |
| | +30% FCCC 3 | 69.5 | | |
| | +30% FCCC 4 | 70.5 | | |
| | +50% FCCC 3 | 78.7 | 56.5 | 41.1 |
| | +50% FCCC 4 | 73.8 | | |
| | +60% FCCC 3 | 67.1 | 59.4 | 38.8 |
| | +70% FCCC 3 | 71.9 | 61.6 | 37.1 |
| | +30% CC1 | 73.7 | | |
| | +50% CC1 | 82.2 | 60.7 | 38.4 |
| | +10% PTFE | 68.3 | 43.9 | 41.6 |
| | +20% PTFE | 69.7 | 41.4 | 43.2 |
| | +10% CC1 +10% PTFE | 67.7 | | |
| | +30% CC1 +10% PTFE | 68.4 | | |
| | +50% CC1 +10% PTFE | 74.2 | | |
| | +30% GF | 69.6 | | |
| | +30% GF +15% PTFE | 77.1 | | |

*wt % based on the total amount of resin

TABLE 8

| | Compound | Contact Angle (°) | | Total Surface |
|---|---|---|---|---|
| Resin | (wt %)* | Water | Diiodomethane | Energy (mN · m$^{-1}$) |
| PET | +25% CC1 | 74.6 | 40.0 | 42.4 |
| | +25% CCC1 | 69.0 | 49.2 | 40.9 |

TABLE 8-continued

| Resin | Compound (wt %)* | Contact Angle (°) | | Total Surface Energy (mN · m$^{-1}$) |
|---|---|---|---|---|
| | | Water | Diiodomethane | |
| | +25% FCCC 3 | 92.7 | 34.0 | 44.2 |
| | +15% GF +25% FCCC 3 | 79.3 | 43.6 | 37.2 |

*wt % based on the total amount of resin

TABLE 9

| Resin | Compound (wt %)* | Contact Angle (°) | | | Surface Energy (mN · m$^{-1}$) | |
|---|---|---|---|---|---|---|
| | | Water | Diiodo-methane | Total | Dispersive | Polar |
| PC/PBT | 15% GF | 82.8 | 30.0 | 45.8 | 43.8 | 2.0 |
| | 15% GF + 10% FCCC 4 (x2)** | 84.6 | 27.5 | 46.6 | 45.2 | 1.4 |

*wt % based on the total amount of resin
**x2 means two times compounded 3.2. Physical and Mechanical Properties As regards the impact on the mechanical properties of resins filled with inventive poly- and/or perfluorinated compound treated calcium carbonates as fillers, a number of experiments was made with different resins, and in comparison with other conventional fillers, as well as mixtures thereof. In this respect, PC (Polycarbonate) is especially interesting, as it is not trivial to use calcium carbonate fillers in polycarbonate resins.

The compounding of the resins was carried out as described above, the results of the tests are summarized in tables 10 to 15.

First of all, it can be seen from tables 10 and 11 that it is possible to fill the resin with a rather high amount of poly- and/or perfluorinated compound treated calcium carbonate of up to 50 wt % based on the total weight of resin to be filled. This is not possible with untreated calcium carbonate.

Density

As regards the density of the filled PC resin, it may be taken from tables 10 and 11 that there is nearly no density increase by the treatment of calcium carbonate with poly- and/or perfluorinated compounds, contrary to, e.g. baryte filled resins, or the additional filling with glass fibres, at comparable properties.

Heat Deflection Temperature (HDT)

The HDT of poly- and/or perfluorinated compound treated calcium carbonates is essentially the same as in untreated PC and in PC filled with untreated calcium carbonate or PTFE, and it is significantly lower than in glass fibre filled PC. Accordingly, there is no negative impact on the HDT by the filler treatment (cf. tables 10 and 11).

Tensile Properties

It can be observed that the filling with poly- and/or perfluorinated compound treated calcium carbonate has a positive impact on the tensile properties of the tested resins compared with other conventional fillers.

For example, the E-modulus of PC filled with poly- and/or perfluorinated compound treated calcium carbonate is higher than the one of unfilled PC, and only slightly lower than the one of PC filled with untreated calcium carbonate, wherein a higher treatment degree leads to a higher E-modulus. This is especially remarkable as PC filled with PTFE has lower E-modulus values, i.e. the increase of the E-modulus, appears to be due to a synergistic effect between calcium carbonate and poly- and/or perfluorinated compound.

Also, an admixture of poly- and/or perfluorinated compound treated calcium carbonate to other filler leads to an increase of the E-modulus, stronger than with the admixture of PTFE, as can be seen from the combination of baryte with PTFE and FCCC 3 (cf. table 10).

At a higher filler degree, it is even comparable to products filled with glass fibres (cf. table 11).

As regards the tensile strength, it can be seen that PC filled with untreated calcium carbonate is subjected to a decrease at filler loads of 30 wt %. In contrast to this, PC filled with poly- and/or perfluorinated compound treated calcium carbonate shows a tensile strength comparable with the one of unfilled PC even at a filler load of up to 30 wt %. Only at 50 wt % poly- and/or perfluorinated compound treated calcium carbonate, the tensile strength decreases.

Anyway, compared with other fillers such as PTFE or baryte, it can be seen that the tensile strength of PC filled with poly- and/or perfluorinated compound treated calcium carbonate is generally higher, except for 50 wt % baryte filler loads.

In combination with glass fibres, it can be observed that the tensile strength of PTFE filled PC and poly- and/or perfluorinated compound treated calcium carbonate filled PC is comparable.

Looking at the yield stress, the same tendencies can be observed.

The elongation at break of calcium carbonate filled PC may be significantly increased by the poly- and/or perfluorinated compound treatment as can be seen from the comparison of the corresponding values.

Furthermore, in combination with glass fibres, it can be observed that the elongation at break of poly- and/or perfluorinated compound treated calcium carbonate filled PC is higher than the one of PTFE filled PC.

TABLE 10

| Resin + wt % compound* | Density (g/cm$^3$) | HDT (° C.) | E-Modulus (N/mm$^2$) | Tensile Strength (N/mm$^2$) | Yield stress (%) | Elongation @ break (%) |
|---|---|---|---|---|---|---|
| PC | 1.18 | 121 | 2200 | 63 | 6.3 | 142 |
| PC + FCCC | | | | | | |
| 10% FCCC 3 | 1.23 | 120 | 2400 | 61 | 5.7 | 55 |
| 10% FCCC 4 | 1.25 | 120 | 2620 | 61 | 5.3 | 25 |
| 30% FCCC 3 | 1.35 | 121 | 2920 | 60 | 4 | 6.1 |
| 30% FCCC 4 | 1.40 | 124 | 3620 | 60 | 3.3 | 3.7 |
| 50% FCCC 3 | 1.62 | 121 | 5280 | 34 | | 0.7 |
| 50% FCCC 4 | 1.62 | 121 | 5880 | 32 | | 0.6 |
| PC + CC | | | | | | |
| 10% CC 1 | 1.25 | 121 | 2600 | 63 | 5.5 | 16 |
| 30% CC 1 | 1.41 | 119 | 3740 | 33 | | 0.9 |
| 50% CC 1 Not feasible | | | | | | |
| PC + PTFE | | | | | | |
| 10% PTFE | 1.24 | 123 | 2000 | 57 | 6.1 | 92 |
| 15% PTFE | 1.27 | 122 | 2070 | 54 | 5.9 | 73 |
| 13% PTFE + 2% Silicone | 1.24 | 121 | 1870 | 53 | 5.7 | 41 |
| 10% PTFE + 5% FCCC 3 (x2)** | 1.26 | 121 | 2280 | 55 | 5.9 | 38 |
| PC + Baryte | | | | | | |
| 30% baryte | 1.50 | 119 | 3180 | 52 | 4 | 10 |
| 30% baryte + 10% PTFE (x2)** | 1.57 | 119 | 2970 | 45 | 4.3 | 13 |

TABLE 10-continued

| Resin + wt % compound* | Density (g/cm³) | HDT (° C.) | E-Modulus (N/mm²) | Tensile Strength (N/mm²) | Yield stress (%) | Elongation @ break (%) |
|---|---|---|---|---|---|---|
| 30% baryte + 10% FCCC 3 | 1.62 | 115 | 3820 | 34 | | 0.9 |
| 50% baryte | 1.85 | 116 | 4140 | 43 | | 1.6 |

*wt % based on the total amount of resin
**x2 means two times compounded

TABLE 11

| | Density (g/cm³) | HDT (° C.) | E-Modulus (N/mm²) | Tensile Strength (N/mm²) | Yield stress (%) | Elongation @ break (%) |
|---|---|---|---|---|---|---|
| PC + 20% GF | 1.32 | 135 | 5930 | 112 | 3.5 | 4 |
| +10% PTFE | 1.39 | 141 | 6320 | 100 | 2.6 | |
| +10% FCCC 3 (x2)** | 1.39 | 130 | 5970 | 98 | 3.2 | 3.9 |
| +10% FCCC 4 (x2)** | 1.39 | 130 | 5690 | 96 | 3.3 | 4 |
| +15% FCCC 3 (x2)** | 1.42 | 135 | 5850 | 94 | 3.1 | 3.5 |
| +5% PTFE + 5% FCCC 3 (x2)** | 1.37 | 135 | 5480 | 92 | 3.4 | 4.4 |
| PC + 30% GF | 1.40 | 135 | 8170 | 135 | | 3.1 |
| +15% PTFE | 1.53 | 141 | 9020 | 106 | | 2 |
| +15% FCCC 3 (x2)** | 1.51 | 131 | 8050 | 111 | | 2.5 |
| +10% PTFE + 5% FCCC 3 (x2)** | 1.52 | 137 | 8690 | 112 | | 2.9 |
| +15% FCCC 4 (x2)** | 1.51 | 128 | 7950 | 107 | | 2.1 |
| +13% PTFE + 2% Silicone | 1.51 | 141 | 8930 | 102 | | 1.8 |

*wt % based on the total amount of resin
**x2 means two times compounded

TABLE 12

| | Density (g/cm³) | HDT (° C.) | E-Modulus (N/mm²) | Tensile Strength (N/mm²) | Yield stress (%) | Elongation @ break (%) |
|---|---|---|---|---|---|---|
| PC/PBT + 15% GF | 1.35 | 91 | 4560 | 78 | 3.5 | 4.1 |
| +10% FCCC 4 (x2)** | 1.41 | 63 | 4540 | 67 | 2.9 | 4.3 |

*wt % based on the total amount of resin
**x2 means two times compounded

The PA66 resin filled with FCCC 15 and 20 as well as CC 1 were examined as regards the E-modulus, elongation at break and tensile strength, as well.

As can be taken from table 13, no negative impact of the treatment with poly- and/or perfluorinated compound on the E-modulus can be observed. For highly filled systems, the treatment of calcium carbonate filler with poly- and/or perfluorinated compound even allows an increase of tensile strength and elongation at break by improving the melt rheology and reducing the melt fracture.

TABLE 13

| Resin + wt % compound* | E-Modulus (N/mm²) | Tensile Strength (N/mm²) | Elongation @ break (%) |
|---|---|---|---|
| PA66 | 1230 | 86 | 8.8 |
| PA66 + FCCC | | | |
| 30% FCCC 15 | 1430 | 80 | 6.2 |
| 30% FCCC 16 | 1510 | 82 | 5.9 |
| 40% FCCC 15 | 1550 | 80 | 4.9 |
| 40% FCCC 16 | 1570 | 83 | 5.3 |
| 50% FCCC 15 | 1490 | 74 | 4.1 |
| 50% FCCC 16 | 1640 | 81 | 4.5 |
| PA66 + CC | | | |
| 30% CC 1 | 1490 | 81 | 6.1 |
| 40% CC 1 | 1620 | 80 | 4.9 |
| 50% CC 1 | 1640 | 72 | 3.6 |

*wt % based on the total amount of resin

Furthermore the impact properties were investigated.

As can be taken from table 14, an increase of the impact strength of poly- and/or perfluorinated compound treated calcium carbonate filled PC can be observed compared with PC filled with untreated calcium carbonate.

Compared with PTFE and baryte filled PCs comparable results are obtained.

In admixtures with glass fibres the impact strength values of poly- and/or perfluorinated compound treated calcium carbonate filled PC are higher than those of merely PTFE filled PC (cf. table 15).

TABLE 14

| Resin + wt % compound* | Impact Strength (N/mm²) | |
|---|---|---|
| | Charpy UN (4J) | Charpy UN (5J) |
| PC | | No break |
| PC + FCCC | | |
| 10% FCCC 3 | | No break |
| 10% FCCC 4 | | No break |
| 30% FCCC 3 | 69 | 65.0 |
| 30% FCCC 4 | 33 | 31.0 |
| 50% FCCC 3 | 5 | 5.0 |
| 50% FCCC 4 | 5 | 4.5 |
| PC + CC | | |
| 10% CC 1 | | No break |
| 30% CC 1 | 10 | 10.0 |
| 50% CC 1 Not feasible | | |
| PC + PTFE | | |
| 10% PTFE | | No break |
| 15% PTFE | | No break |
| 13% PTFE + 2% Silicone | | No break |
| 10% PTFE + 5% FCCC 3 (x2)** | | No break |
| PC + Baryte | | |
| 30% baryte | 85 | 97.0 |
| 30% baryte + 10% PTFE (x2)** | 66 | 50.0 |
| 30% baryte + 10% FCCC 3 | 4 | |
| 50% baryte | 9 | |

*wt % based on the total amount of resin
**x2 means two times compounded

TABLE 15

| Resin + wt % compound* | Impact Strength (N/mm²) Charpy UN (4J) |
|---|---|
| PC + 20% GF | 62 |
| +10% PTFE | 39 |
| +10% FCCC 3 (x2)** | 53 |
| +10% FCCC 4 (x2)** | 50 |
| +15% FCCC 3 (x2)** | 46 |
| +5% PTFE | 54 |
| +5% FCCC 3 (x2)** | |
| PC + 30% GF | 62 |
| +15% PTFE | 35 |
| +15% FCCC 3 (x2)** | 41 |
| +10% PTFE | 47 |
| +5% FCCC 3 (x2)** | |
| +15% FCCC 4 (x2)** | 37 |
| +13% PTFE | 31 |
| +2% Silicone | |

*wt % based on the total amount of resin
*x2 means two times compounded

TABLE 16

| Resin + wt % compound* | Impact Strength (N/mm²) Charpy UN (4J) |
|---|---|
| PC/PBT + 15% GF | 38 |
| +10% FCCC 4 (x2)** | 41 |

*wt % based on the total amount of resin
*x2 means two times compounded

Furthermore, as can be taken from table 17, there is no negative influence of poly- and/or perfluorinated compound treated calcium carbonate on the impact properties versus untreated calcium carbonate in PA66.

TABLE 17

| Resin + wt % compound* | Impact Strength (N/mm²) Charpy notched (N/mm²) |
|---|---|
| PA66 | 6.6 |
| PA66 + FCCC | |
| 30% FCCC 15 | 4.3 |
| 30% FCCC 16 | 3.1 |
| 40% FCCC 15 | 3.3 |
| 40% FCCC 16 | 3.2 |
| 50% FCCC 15 | 3.4 |
| 50% FCCC 16 | 3.4 |
| PA66 + CC | |
| 30% CC 1 | 3.2 |
| 40% CC 1 | 3.2 |
| 50% CC 1 | 3.4 |

*wt % based on the total amount of resin

Thermal Conductivity

As can be seen from table 18, the poly- and/or perfluorinated compound treatment of calcium carbonate increases the axial and radial thermal conductivity of PA66, which is advantageous and allows for new application fields of PA66, and the replacement of otherwise applied additives such as copper powders, at an increased filler load.

TABLE 18

| | | Thermal conductivity $\lambda$ (W·m⁻¹·K⁻¹) | | | |
|---|---|---|---|---|---|
| | Compound | axial | | radial | |
| Resin | (wt %) | 22° C. | 155° C. | 22° C. | 155° C. |
| PA66 | +20% CC 1 | 0.40 | 0.34 | 0.44 | 0.44 |
| | +20% FCCC 3 Not measured | | | | |
| | +50% CC 1 | 0.59 | 0.54 | 0.65 | 0.59 |
| | +50% FCCC 3 | 0.66 | 0.61 | 0.72 | 0.66 |
| | +70% CC 1 Not feasible | | | | |
| | +70% FCCC 3 | 0.91 | 0.84 | 0.88 | 0.77 |

As regards the thermal conductivity of the PET/15% GE resin, it can be seen that the thermal conductivity is about the same in the treated and untreated calcium carbonate filled samples. However, due to the fact that the poly- and/or perfluorinated compound can be added at a higher filler load, the thermal conductivity can be increased (cf. table 19).

TABLE 19

| | | Thermal conductivity $\lambda$ (W·m⁻¹·K⁻¹) | | | |
|---|---|---|---|---|---|
| | Compound | axial | | radial | |
| Resin | (wt %) | 22° C. | 155° C. | 22° C. | 155° C. |
| PET/ 15% GF | +40% CC 1 | 0.42 | 0.48 | 0.48 | 0.49 |
| | +40% FCCC 3 | 0.42 | 0.43 | 0.48 | 0.53 |
| | +40% CC 1 Not feasible | — | — | — | — |
| | +40% FCCC 3 | 0.54 | 0.57 | 0.60 | 0.66 |

The invention claimed is:

1. A fluorinated compound treated calcium carbonate, characterized in that the calcium carbonate is surface treated with at least one functionalized poly- and/or perfluorinated compound, wherein
    (i) the calcium carbonate has a weight median particle size $d_{50}$ value from more than 1.5 μm to 20 μm; and
    (ii) the at least one functionalized poly- and/or perfluorinated compound is selected from the group consisting of poly(hexafluoropropylene oxide)s having at least one terminal functional group, where a first terminal functional group is a terminal carboxyl group located on the terminal fluoromethylene group thereof.

2. The fluorinated compound treated calcium carbonate according to claim 1, wherein the calcium carbonate is selected from the group consisting of natural ground calcium carbonate (GCC), marble, chalk, limestone, dolomite, precipitated calcium carbonate (PCC), PCC having aragonitic crystal forms, PCC having vateritic crystal forms, PCC having calcitic crystal forms, and mixtures thereof.

3. The fluorinated compound treated calcium carbonate according to claim 1, wherein the calcium carbonate has
    a) a weight median particle size $d_{50}$ value in the range from 1.8 μm to 20 μm, and/or
    b) a top cut particle size ($d_{98}$) of not more than 100 μm, and/or
    c) a specific surface area (BET) of from 0.5 to 150 m²/g as measured by the BET nitrogen method.

4. The fluorinated compound treated calcium carbonate according to claim 1, wherein the calcium carbonate is selected from the group consisting of a dry ground calcium carbonate having a weight median particle diameter $d_{50}$ of more than 1.5 μm to 2.0 μm and a BET specific surface area of 3.3 to 4.8 m$^2$/g; and a wet ground and spray dried calcium carbonate having a BET specific surface area of 7.0 to 9.0 m$^2$/g.

5. The fluorinated compound treated calcium carbonate according to claim 1, wherein the at least one functionalized poly- and/or perfluorinated compound has at least two functional terminal groups, which may be the same or different.

6. The fluorinated compound treated calcium carbonate according to claim 1, wherein the at least one functionalized poly- and/or perfluorinated compound further comprises a second terminal functional group selected from the group consisting of hydroxyl, methoxy, carboxyl, alkoxycarbonyl, methoxycarbonyl, ethoxycarbonyl, methylene alcohol, allyl ether, amino, ammonio, carboxamido, sulfanyl, sulfonyl, sulfo, alkoxysulfonyl, phosphate ester, their salts, derivatives and mixtures thereof.

7. The fluorinated compound treated calcium carbonate according to claim 1, wherein the at least one functionalized poly- and/or perfluorinated compound is selected from the group consisting of poly(hexafluoropropylene oxide)s with a chemical formula F—(CF(CF$_3$)—CF$_2$—O)$_n$—CF$_2$CF$_3$, wherein n is 10-60, which are functionalized with a carboxylic acid group situated on the terminal fluoromethylene group and have a molecular weight of about 2500 g/mole and poly(hexafluoropropylene oxide)s with a chemical formula F—(CF(CF$_3$)—CF$_2$—O)$_n$—CF$_2$CF$_3$, wherein n is 10-60, which are functionalized with a carboxylic acid group situated on the terminal fluoromethylene group and have a molecular weight of 7000-7500 g/mole.

8. The fluorinated compound treated calcium carbonate according to claim 1, wherein the at least one functionalized poly- and/or perfluorinated compound has two terminal functional groups, which may the same or different.

9. The fluorinated compound treated calcium carbonate according to claim 1, wherein the at least one functionalized poly- and/or perfluorinated compound has two terminal functional groups, wherein the second terminal functional group is selected from the group consisting of a phosphate ester group, a hydroxy group, their salts, derivatives and mixtures thereof.

10. The fluorinated compound treated calcium carbonate according to claim 1, wherein the fluorinated compound treated calcium carbonate comprises from 0.1 wt % to 10 wt % of the at least one functionalized poly- and/or perfluorinated compound relative to the weight of calcium carbonate.

11. A process for preparing the fluorinated compound treated calcium carbonate according to claim 1, wherein the process comprises the steps of
providing the at least one calcium carbonate,
providing the at least one functionalized poly- and/or perfluorinated compound, and
combining the at least one calcium carbonate and the at least one functionalized poly- and/or perfluorinated compound.

12. The process according to claim 11, wherein the at least one calcium carbonate and the at least one functionalized poly- and/or perfluorinated compound, independently from each other, are provided in a dry form, or in the form of a slurry, dispersion, emulsion or solution.

13. The process according to claim 11, wherein the at least one functionalized poly- and/or perfluorinated compound is combined with the at least one calcium carbonate in an amount of from 0.1 wt % to 10 wt % relative to the weight of calcium carbonate.

14. The process according to claim 11, wherein the obtained poly- and/or perfluorinated compound treated calcium carbonate is dried and/or deagglomerated.

15. A fluorinated compound treated calcium carbonate obtained by the process according to claim 11.

16. A filler comprising the fluorinated compound treated calcium carbonate according to claim 1.

17. A surface coating composition comprising the fluorinated compound treated calcium carbonate according to claim 1.

18. A polymer comprising the fluorinated compound treated calcium carbonate according to claim 1.

19. The polymer according to claim 18, wherein the polymer is selected from the group consisting of acrylonitrile butadiene styrenes (ABS), polyamides (PA), PA6, polybutylene terephthalates (PBT), polycarbonates (PC), polyethylene terephthalates (PET), polyimides, polyoxymethylene plastics (POM/acetal), polyphenylene oxides (PPO), polysulphones (PSU), poly(ethylene succinate)s (PES), polyethylenimins (PEI), polystyrenes (PS), poly(methyl methacrylat)s (PMMA), thermoplastic elastomers (TPE), derivatives, and mixtures thereof.

20. A fluorinated compound treated calcium carbonate, characterized in that the calcium carbonate is surface treated with at least one functionalized poly- and/or perfluorinated compound, wherein
(i) the calcium carbonate has a weight median particle size d$_{50}$ value from more than 1.5 μm to 20 μm;
(ii) the at least one functionalized poly- and/or perfluorinated compound is selected from the group consisting of poly(hexafluoropropylene oxide)s with a chemical formula F—(CF(CF$_3$)—CF$_2$—O)$_n$—CF$_2$CF$_3$, wherein n is 10-60, which are functionalized with a carboxylic acid group situated on the terminal fluoromethylene group and have a molecular weight of about 2500 g/mole and poly(hexafluoropropylene oxide)s with a chemical formula F—(CF(CF$_3$)—CF$_2$—O)$_n$—CF$_2$CF$_3$, wherein n is 10-60, which are functionalized with a carboxylic acid group situated on the terminal fluoromethylene group and have a molecular weight of 7000-7500 g/mole.

21. A fluorinated compound treated calcium carbonate, characterized in that the calcium carbonate is surface treated with at least one functionalized poly- and/or perfluorinated compound, wherein
(i) the calcium carbonate has a weight median particle size d$_{50}$ value from more than 1.5 μm to 20 μm;
(ii) the at least one functionalized poly- and/or perfluorinated compound is selected from the group consisting of functionalized poly- and/or perfluoropolyethers having two terminal functional groups, wherein one of the two terminal functional groups is selected from the group consisting of a carboxyl group terminally located on fluoromethylene group of the functionalized poly- and/or perfluoropolyether, its salts, derivatives and mixtures thereof and the other terminal functional group is selected from the group consisting of a phosphate ester group, a hydroxy group, their salts, derivatives and mixtures thereof.

* * * * *